Nov. 17, 1953  A. R. A. BEEBER  2,659,153
MEASURING TAPE
Filed June 21, 1949
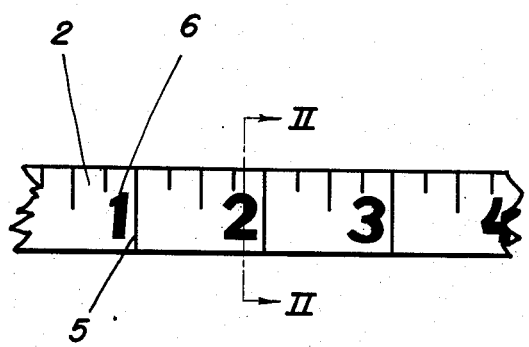
Fig. I
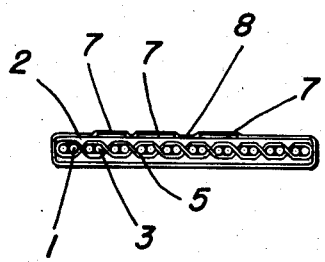
Fig. II
INVENTOR.
ALLAN R. A. BEEBER
BY
ATTORNEY Patented Nov. 17, 1953

2,659,153

UNITED STATES PATENT OFFICE 2,659,153

MEASURING TAPE

Allan R. A. Beeber, Matawan, N. J., assignor to Keuffel & Esser Company, Hoboken, N. J., a corporation of New Jersey Application June 21, 1949, Serial No. 100,335

5 Claims. (Cl. 33—137)

This invention relates to measuring tapes which are formed from a woven fabric strip.

Tapes of this general type have long been known in the art but they have been relatively expensive to make and not entirely satisfactory in many respects. The prior art tapes were formed from a woven fabric strip by singeing the strip to remove loose ends of the fabric, passing the strip through a sizing bath containing starch, preferably with a small amount of wax, after which the tape was dried. The dry tape was then calendered which included passing the tape through heated rolls one of which may or may not have been travelling at a greater or less speed than the tape which was, in effect, an ironing operation. This tended to reduce the thickness of the strip by flattening the threads. From the calender the strip was passed into an impregnating solution which was primarily an oxidizing oil such as China-wood oil or linseed oil with a drier. When the strip was thoroughly impregnated with an oil it was permitted to air dry until it could be calendered again.

The impregnated tape was then coated with a paint containing a pigment such as white lead, a drying oil such as linseed oil, and a thinner such as turpentine. When the tape had been dried it was calendered and given a second coat. When this coat was dry the strip was again calendered and exposed to the atmosphere preferably for several days to insure thorough drying. The strip was then printed with numerals and indicia which were protected by the application of a top coat of relatively non-yellowing drying varnish and again dried to produce the finished tape.

This process was extremely tedious particularly because of the long periods of time which were necessary in order to allow the various coatings to air dry. During these drying periods it was necessary to wind the tapes on bulky reels called Ferris wheels which kept the tape spaced apart. The tape could not be wound on itself since it would stick together. These factors contributed to making the tape expensive. A similar drying period was required after printing which was achieved by coiling the tape on poles and allowing it to stand.

Furthermore the tape so made was not very durable. Continued bending or winding of the old type tape would crack the varnish, paint and linseed oil coatings, and cause the starch layer to powder loose carrying with it the overlying enamel layers and the printing thus rendering the tape illegible. Once the outer coatings were cracked the tape was also left open to attack by moisture which would penetrate through the cracks in these coatings to the starch. Moisture tended to swell the starch and lift the coating. The prior art tape had very limited resistance to abrasion or wear. The pigment and vehicle used were not suitable for making a pure white background for the indicia which would retain its whiteness for long periods of time in use.

The object of this invention is to make an improved woven fabric measuring tape having improved wear resistance, improved resistance to scuffing and cracking and to moisture and which may have improved whiteness in the background areas offering greater contrast with the indicia including the graduation lines.

Another object of the invention is to provide a greatly simplified method for processing woven fabric measuring tapes which results in a substantial saving in cost of the finished tape which has improved properties.

These objects of the invention and the means of their attainment will become more apparent from the following description taken in connection with the accompanying drawings in which:

Fig. I is a view in plan of a section of a measuring tape made from a woven fabric strip according to the invention.

Fig. II is a view in diagrammatic enlarged sectional elevation taken along the line II—II of Fig. I and looking in the direction of the arrows.

The measuring tape shown in Figs. I and II is based on a woven fabric strip which is coated with a pigmented synthetic coating to form a background 2 which is preferably white or a dye is incorporated to give it a light color. Indicia 7 including graduation lines 5 and numbers 6 are imprinted on the background 2. A clear coating 8 best seen in Fig. II is provided covering the pigmented synthetic background coating 2 and the indicia 7. The woven fabric strip as may be seen in Fig. II is usually provided with straight warp threads 3 and filler threads 5.

This invention is directed to the coatings 2 and 8 and the imprinted indicia 7 in combination with a woven fabric strip. However, it is not intended to limit the invention to any particular form of the fabric strip. Certain types of woven fabric tapes have metallic strands woven in with organic threads. U. S. Patent No. 2,321,920 to A. W. Keuffel et al. describes a woven fabric tape based on a woven fabric strip containing glass filament threads. Recently a woven fabric strip for measuring tapes has been proposed which is made up of oriented saponified cellulose acetate threads and glass fiber threads. This is disclosed in patent application Serial No. 87,647, filed April 15, 1949. The coatings described herein are intended for use with any of the aforementioned fabric strips or with other fabric strips. However, a measuring tape made from a woven fabric strip of oriented saponified cellulose acetate threads and glass fiber threads in the warp and having nylon filler threads and nylon warp threads at the edge of the strip and coated and imprinted as herein taught is preferred.

An important feature of the invention is the elimination of the step of sizing the fabric strip with starch. The fabric strip is coated directly with a synthetic resin coating which seals the threads. There is nothing to absorb moisture and undermine the other coatings as in the prior art tapes. Furthermore the coated tape presents a smoother surface than prior art tapes. It therefore does not catch and hold dirt and is readily wiped clean with a damp cloth. The improved tape gives evidence of having greater dimensional stability than the old tapes. This may be due to the sealing of the threads so that they cannot be affected by moisture and the like.

The synthetic plastic coating is preferably applied in the form of an organosol of the type made up of a synthetic resin suspended in water with a small quantity of a stabilizing agent to insure good colloidal stability. Suitable organosols are those containing polyvinyl chloride type synthetic resins. The term polyvinyl chloride type synthetic resins as used herein is meant to include vinyl chloride resins, vinylidene chloride resins, or combinations of vinyl chlorides and vinylidene chlorides. However, other resins may also be included in the organosols. A suitable pigment preferably titanium dioxide is added to the organosol used to form the synthetic background coating 2. If desired a dye may also be added to tint the tape a distinctive pale color. A wetting agent which may for example be of an aliphatic alcohol sulfate type may be used. Better dimensional stability has been obtained in the tapes where a wetting agent was added to the coating. The following formula was found to give a successful background coating:

500 liters polyvinyl chloride resin type organosol
500 liters water
75 kilograms titanium dioxide The fabric strip is dipped into the organosol, excess material is removed with a squeegee or the like, and passed through a heated chamber at approximately 250° C. to dry out the pigmented organosol and flux or fuse it to form a pigmented synthetic coating on the fabric. The strip is then passed through calender rolls heated to about 95° C. which iron the strip and keep it from becoming too thick and bulky.

The strip is preferably given three coats of the pigmented synthetic coating by repeating the above steps three times. The three coatings including the drying, fusing and calendering operations may be given to the strip in one continuous coating machine which is designed to operate at the rate of 60 ft. of tape per minute. This continuous high speed operation producing a completely coated dry strip contrasts with the prior art process in which it was necessary to permit the tape to dry for long periods between coating operations.

The coated strip is then run through a printing machine which imprints the strip with indicia which usually include graduation lines and numbers. The printing machine may be of the type previously used in the art and any of several kinds of ink may be used. It is preferred however to use a quick drying ink so that the tape can be rolled up on itself soon after printing. Commercial inks for use on vinyl materials are satisfactory. The ink containing the usual pigments and vehicles preferably includes synthetic resins which adhere well to the synthetic resin background coating 2. Infrared lamps are preferred for drying and setting the ink.

The top coat may be applied in one stage by immersing the tape in an unpigmented organosol. The coating composition can be made by diluting a polyvinyl chloride type organosol with equal parts of water. Excess coating is removed with a squeegee or the like. The coating is then dried and fused by passing the tape through a heating chamber. Since this type of coating is thermoplastic the heating of the topcoat will tend to soften the background coating so that a good bond will be obtained between the topcoat and the background coats. The topcoated tape may then be calendered to hold it to the required thickness. However if the thickness of the tape can be tolerated it is preferable not to calender the tape to retain maximum thickness of the topcoat which will provide maximum protection for the printed indicia.

The heating of the topcoating may be to a higher temperature than was used for fusing the background coating in order to increase the bond between the two coatings. It is also possible to merely dry the background coats or only partially fuse them and then fuse all coats together when the tape has been printed and the topcoat is applied. However a disadvantage of this method is the difficulty involved in handling the tape before the coating is fused. Under these conditions it may even tend to stick on the rollers of the machine.

In the case where each applied coating is completely fused before applying subsequent coatings it may actually be preferred to use a somewhat higher temperature for the very first coat since this coat penetrates into the woven fabric strip and is more difficult to dry.

The process described produces a coated cloth tape having superior resistance to wrinkling, to abrasion and to moisture and which is less expensive to produce. Minor variations may be made within the spirit and scope of the invention.

What is claimed is:

1. A measuring tape comprising a woven fabric strip having aligned warp threads comprising glass fiber threads and saponified oriented cellulose acetate filament threads and a sinuous filler of nylon threads interconnecting said warp threads, a synthetic resinous coating including polyvinyl chloride type resins and a pigment on said woven fabric strip, indicia including graduation lines in a contrasting color imprinted on said synthetic coating and a clear coating over said pigmented synthetic resinous coating and said indicia.

2. The method for making a measuring tape comprising the steps of applying directly on a woven fabric strip an organosol comprising a thermoplastic resin selected from the group consisting of polyvinyl chloride resins, polyvinylidene chloride resins and combinations thereof containing a pigment, heating the strip to dry said organosol and fuse it to form a continuous pigmented synthetic resinous coating on the strip, imprinting indicia including graduation lines in a contrasting color on the coated strip and applying an organosol to said strip comprising a clear thermoplastic resin selected from the group consisting of polyvinyl chloride resins, polyvinylidene chloride resins and combinations thereof, heating the strip to dry the said clear resin, fuse it, bond it to said pigmented coating and form a protective film over said indicia.

3. A measuring tape comprising a woven fabric strip, a fused resinous coating containing a pigment coated directly on said woven fabric strip, said pigmented coating comprising a resin selected from the group consisting of polyvinyl chloride resins, polyvinylidene chloride resins and combinations thereof, indicia including graduation lines in a contrasting color imprinted on said resinous pigmented coating and a fused clear coating coated on said pigmented resinous coating and said indicia, said clear coating comprising a resin selected from the group consisting of polyvinyl chloride resins, polyvinylidene chloride resins and combinations thereof, bonded with said pigmented resinous coating and forming a protective film over said indicia.

4. A measuring tape comprising a woven fabric strip, a fused resinous coating containing a titanium dioxide pigment coated directly on said woven fabric strip, said pigmented coating comprising a resin selected from the group consisting of polyvinyl chloride resins, polyvinylidene chloride resins and combinations thereof, indicia including graduation lines in a contrasting color imprinted on said resinous pigmented coating and a fused clear coating coated on said pigmented resinous coating and said indicia, said clear coating comprising a resin selected from the group consisting of polyvinyl chloride resins, polyvinylidene chloride resins and combinations thereof, bonded with said pigmented resinous coating and forming a protective film over said indicia.

5. A measuring tape comprising a woven fabric strip, a fused resinous coating containing a plasticizer and a pigment coated directly on said woven fabric strip, said pigmented coating comprising a resin selected from the group consisting of polyvinyl chloride resins, polyvinylidene chloride resins and combinations thereof, indicia including graduation lines in a contrasting color imprinted on said resinous pigmented coating and a fused clear coating coated on said pigmented resinous coating and said indicia, said clear coating comprising a resin selected from the group consisting of polyvinyl chloride resins, polyvinylidene chloride resins and combinations thereof, bonded with said pigmented resinous coating and forming a protective film over said indicia.

ALLAN R. A. BEEBER.

References Cited in the file of this patent

UNITED STATES PATENTS

| Number | Name | Date |
| --- | --- | --- |
| 232,122 | Hammesfahr | Sept. 14, 1880 |
| 2,089,209 | Keuffel et al. | Aug. 10, 1937 |
| 2,090,623 | Damitz | Aug. 24, 1937 |
| 2,321,920 | Keuffel | June 15, 1943 |
| 2,343,095 | Smith | Feb. 29, 1944 |
| 2,431,745 | Flanagan | Dec. 2, 1947 |